United States Patent [19]

Matsuba

[11] Patent Number: 5,331,611
[45] Date of Patent: Jul. 19, 1994

[54] TRANSMISSION MECHANISM FOR MAGNETIC-FIELD GENERATING DEVICE IN PHOTO-MAGNETIC TYPE RECORDING/REPRODUCING APPARATUS

[75] Inventor: Hiroyuki Matsuba, Fukuoka, Japan

[73] Assignee: Matsushita Electric Industrial Co., Ltd., Osaka, Japan

[21] Appl. No.: 899,981

[22] Filed: Jun. 17, 1992

[30] Foreign Application Priority Data

Jul. 2, 1991 [JP] Japan .................. 3-161554

[51] Int. Cl.⁵ .............................. G11B 13/04
[52] U.S. Cl. ........................ 369/13; 360/114
[58] Field of Search ............... 369/13, 244, 215, 219, 369/220, 221, 222; 360/59, 114

[56] References Cited

U.S. PATENT DOCUMENTS

| | | | |
|---|---|---|---|
| 5,027,334 | 6/1991 | Yamanaka et al. | 369/13 |
| 5,122,998 | 6/1992 | Mizuno et al. | 369/13 |
| 5,179,544 | 1/1993 | Hezemans et al. | 360/59 |
| 5,193,080 | 3/1993 | Mohri et al. | 369/13 |
| 5,239,532 | 8/1993 | Hensing et al. | 369/13 |

FOREIGN PATENT DOCUMENTS 210545 1/1990 Japan .

*Primary Examiner*—Robert J. Pascal
*Assistant Examiner*—Tan Dinh
*Attorney, Agent, or Firm*—Lowe, Price, LeBlanc & Becker

[57] ABSTRACT

A recording/reproducing apparatus equipped with an optical pickup device movably disposed in opposed relation to a recording medium for applying a light beam to the recording medium to receive light reflected from the recording medium, and further equipped with a magnetic-field generating device also movably disposed in opposed relation to the recording medium for generating a magnetic field with respect to the recording medium. The optical pickup device and the magnetic-field generating device are coupled to each other through a power transmission device whereby the magnetic-field generating device is driven in connection with a movement of the optical pickup device. The magnetic-field generating device is supported by a rotatable supporting member, and the power transmission device comprises a projection attached to the supporting member and a lever having a configuration engageable with the projection. The projection is arranged to come into contact with a portion of the optical pickup device when the optical pickup device is moved in a first predetermined direction whereby the supporting member is rotatable in a second predetermined direction. The rotating movement of the supporting member is controlled in accordance with the engaging state of the projection with the lever.

19 Claims, 13 Drawing Sheets

TRANSMISSION MECHANISM FOR MAGNETIC-FIELD GENERATING DEVICE IN PHOTO-MAGNETIC TYPE RECORDING/REPRODUCING APPARATUS

BACKGROUND OF THE INVENTION

The present invention relates to a photo-magnetic type recording/reproducing apparatus which is applicable to an external storage of a computer or the like, and more particularly to a power transmission mechanism for driving a magnetic field generating means in such a photo-magnetic type recording/reproducing apparatus.

Recently, of recording/reproducing systems for recording, reproducing and erasing information by using laser light, a so-called photo-magnetic disc apparatus is known which records and erases information with a magnetic field being applied to a recording medium (photo-magnetic disc), the photo-magnetic disc being detachable from the photo-magnetic disc apparatus and encased in a case to constitute a cartridge for protection of its recording surface. For applying the magnetic field to the photo-magnetic disc, a magnetic field generating means comprising an electro-magnet is provided at the vicinity of the recording surface. However, a drive source such as an electric motor is required to be exclusively provided for moving the magnetic field generating means, thus making difficult the size-reduction of the apparatus.

SUMMARY OF THE INVENTION

It is therefore an object of the present invention to provide a photo-magnetic type recording/reproducing apparatus whose size is small and whose structure is simple.

One feature of this invention is that in a recording/reproducing apparatus equipped with an optical pickup device movably disposed in opposed relation to a recording medium for applying a light beam to the recording medium to receive light reflected from the recording medium, and further equipped with a magnetic-field generating device also movably disposed in opposed relation to the recording medium for generating a magnetic field with respect to the recording medium, the optical pickup device and the magnetic-field generating device are coupled to each other through a power transmission device whereby the magnetic-field generating device is driven in connection with a movement of the optical pickup device.

Preferably, the magnetic-field generating device is supported by a rotatable supporting member, and the power transmission device comprises a projection attached to the supporting member and a lever having a configuration engageable with the projection. The projection is arranged to come into contact with a portion of the optical pickup device when the optical pickup device is moved in a first predetermined direction whereby the supporting member is rotatable in a second predetermined direction. The rotating movement of the supporting member is controlled in accordance with the engaging state of the projection with the lever.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 21:
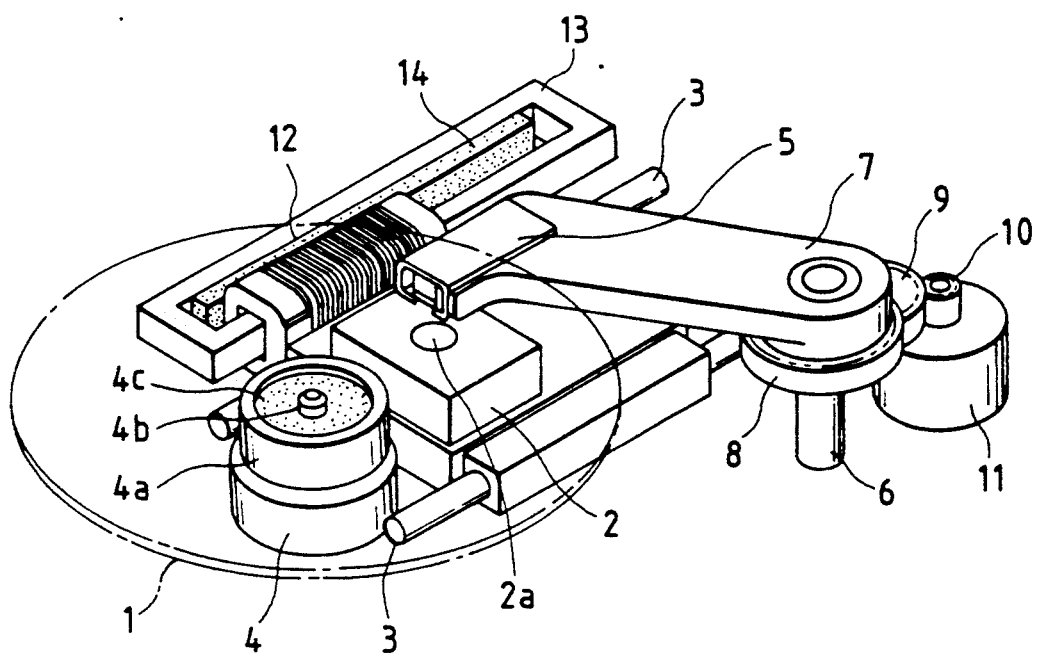
FIGS. 21 to 29 are illustrations for describing an arrangement of a conventional recording/reproducing apparatus.
Figure 22:
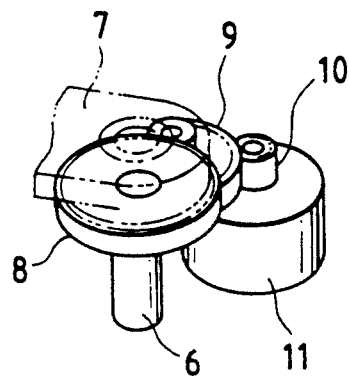

Prior to describing the present invention, a brief description will be made hereinbelow with reference to FIGS. 21 to 29 in terms of a conventional photo-magnetic disc apparatus for a better understanding of this invention. In FIG. 21, designated at numeral 1 is a photo-magnetic disc which is a recording medium (normally encased in a case as illustrated in FIGS. 3 to 6), and denoted at numeral 2 is an optical pickup device for reading, easing and writing information from and on the photo-magnetic disc 1. The optical pickup device 2 is equipped with an objective lens 2a to focus a laser beam and is held to be movable along a guiding shaft 3 in the radial directions of the photo-magnetic disc 1. Numeral 4 is a motor for rotating the photo-magnetic disc 1, the motor 4 being connected to a rotatable table 4a rotatable about a rotating shaft 4b, whereby the rotating force of the motor 4 is transferred to the photo-magnetic disc 1. Around the rotating shaft 4b there is provided a permanent magnet 4c. Further, provided is an electro-magnet 5 which is arranged to be movable in parallel to the surface of the photo-magnetic disc 1 and which acts as a magnetic field generating means to generate a magnetic field with respect to a given position of the photo-magnetic disc 1 at the time of the writing and erasing of the information. As illustrated in FIG. 22, the electro-magnet 5 is attached to an arm 7 rotatable about a shaft 6 and the arm 7 is coupled through toothed wheels 8 to 10 to a motor 11 so as to be driven in accordance with the drive of the motor 11. Still further, provided a motor comprising a coil 12 attached to the optical pickup device 2, a ferromagnetic material-made yoke 13 attached to a chassis and a permanent magnet 14 attached to the yoke 13. When a current is supplied to the coil 12, the optical pickup device 2 is moved along the guiding shaft 3 in the radius directions of the photo-magnetic disc 1.

Figure 3:
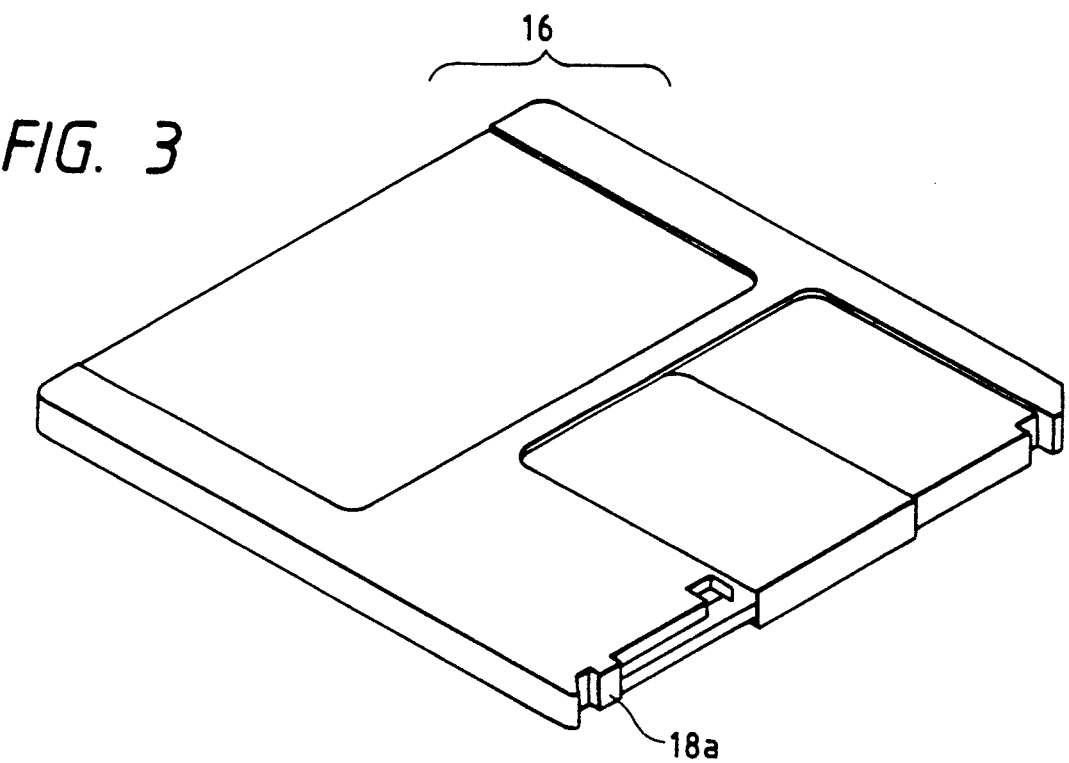
FIGS. 3 to 6 are illustrations of a cartridge encasing a recording medium.
Figure 4:
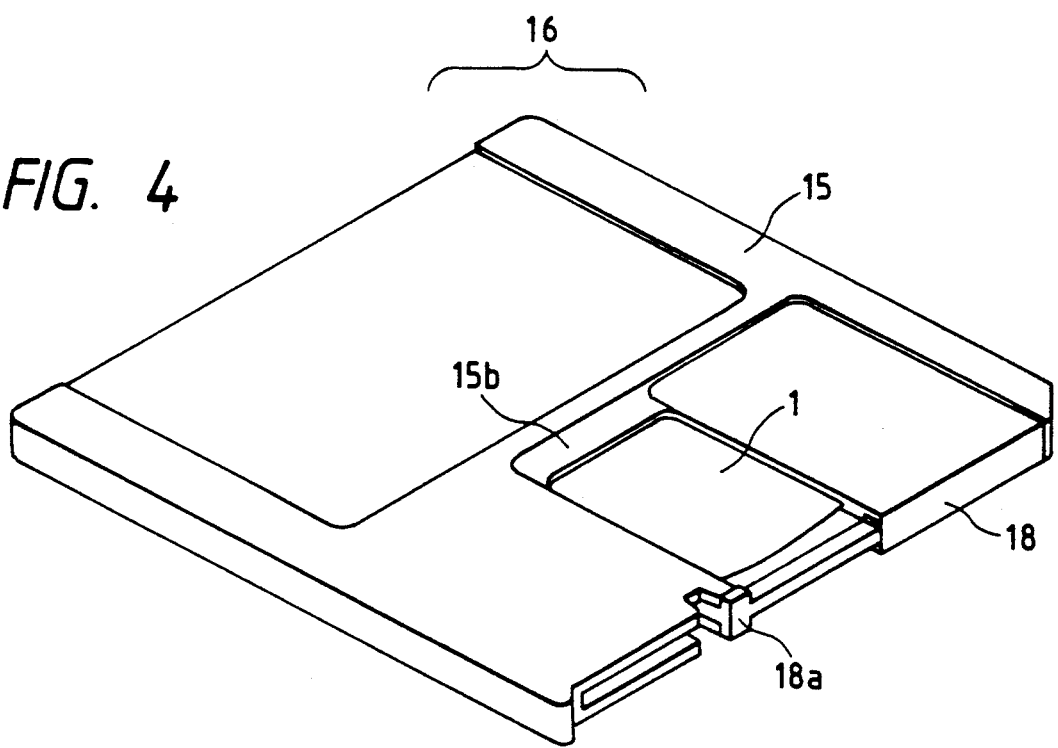
Figure 5:
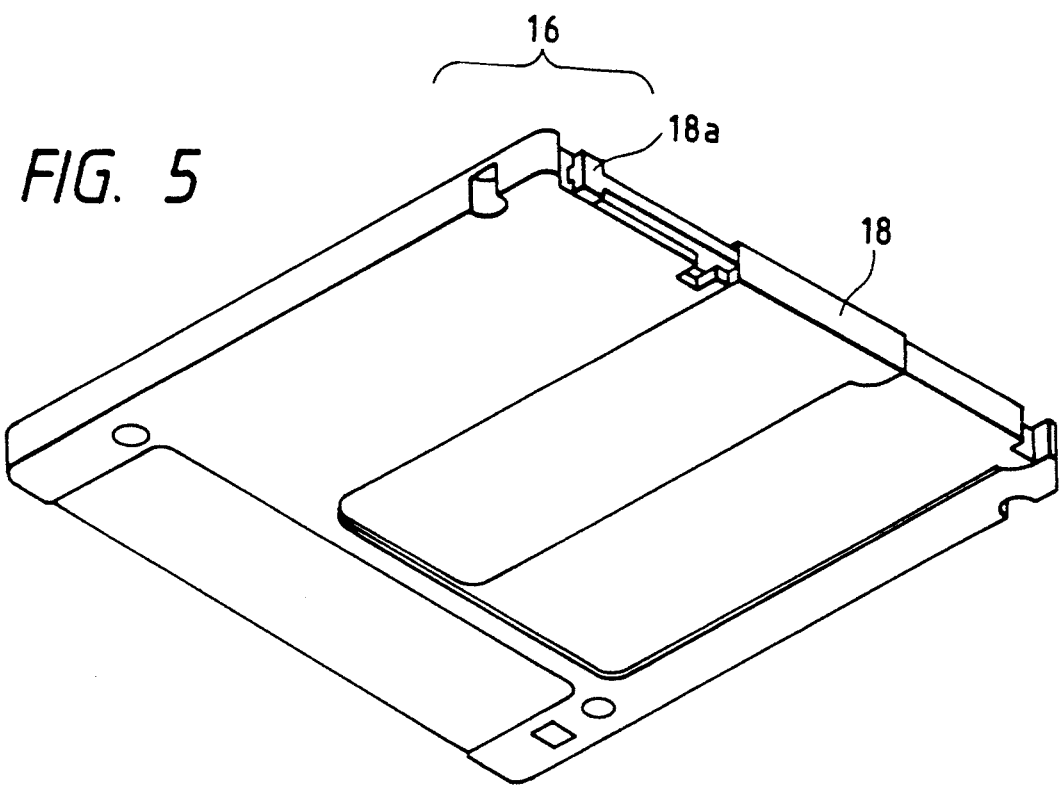
Figure 6:
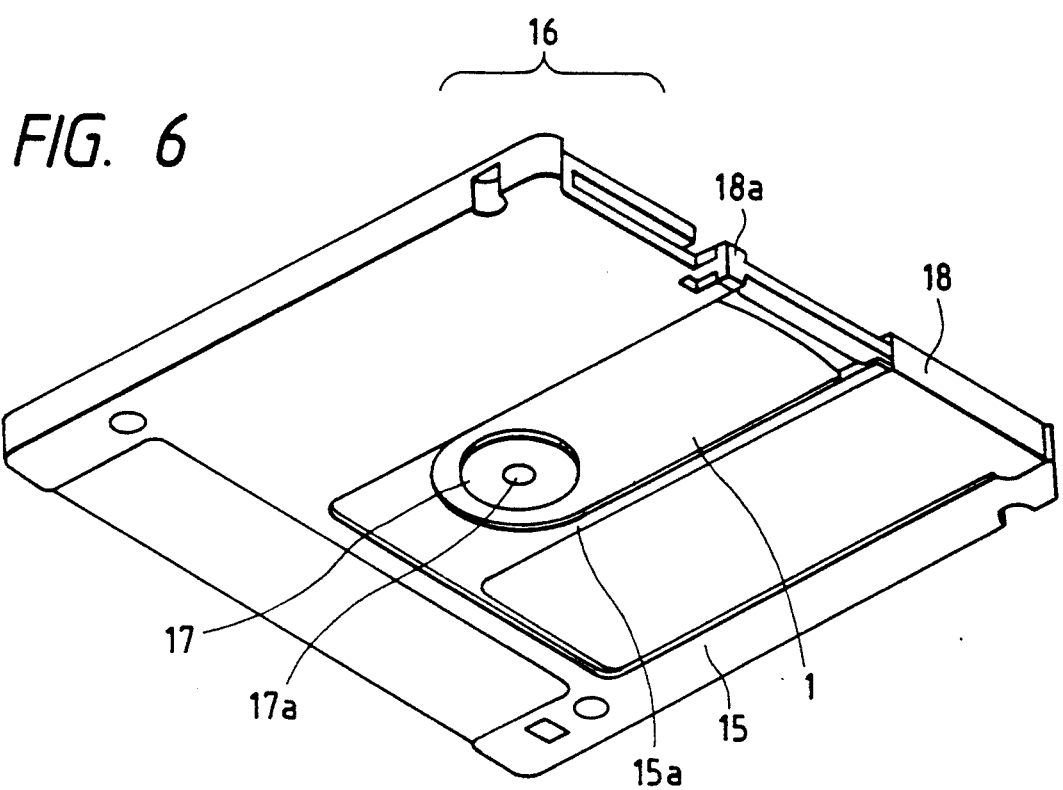

FIGS. 3 to 6 are perspective views showing cartridges 16 each comprising the photo-magnetic disc 1 and a case 15. Of these drawings, FIGS. 3 and 4 are illustrations of the cartridges 16 viewed from the side facing the electro-magnet 5, FIG. 3 illustrating the state that its shutter 18 is closed and FIG. 4 illustrating the state that the shutter 18 is opened, and FIGS. 5 and 6 are illustrations of the cartridges 16 viewed from the side facing the optical pickup device 2, FIG. 5 illustrating the state that the shutter 18 is closed and FIG. 6 illustrating the state that the shutter 18 is opened. As illustrated in FIG. 6, at the center portion of the photo-magnetic disc 1 there is provided a ferromagnetic disc-like member 17 and further at the center portion of the ferromagnetic disc-like member 17 there is formed a positioning hole 17a. In addition, as illustrated in FIGS. 4 and 6, a first opening 15a is formed at the side facing the electro-magnet 5 and a second opening 15a is formed at the side facing the optical pickup device 2. The shutter 18 is equipped with a slider 18a normally biased (or urged) by a spring (not shown) so that the shutter 18 is closed for protecting the photo-magnetic disc 1 from dust and damage as illustrated in FIGS. 3 and 5. further, the slider 18a is slidable so that the shutter 18 takes the opening state and the first and second openings 15a, 15b appear as illustrated in FIGS. 4 and 6.

Figure 23:
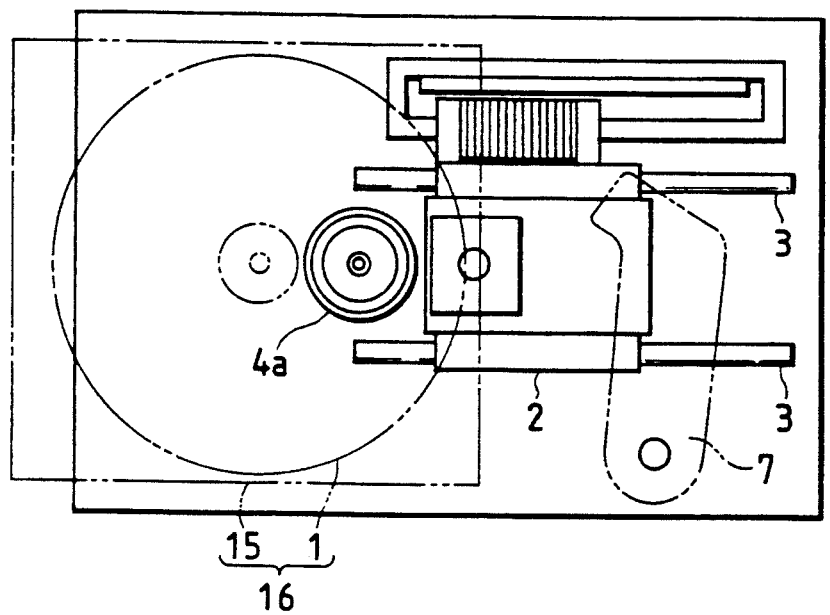
Figure 24:
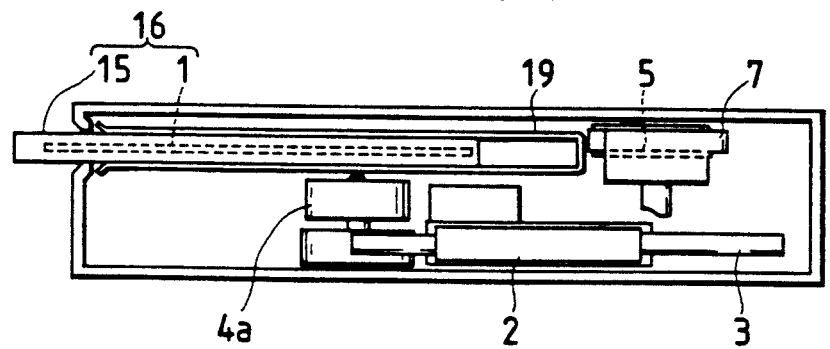
Figure 25:
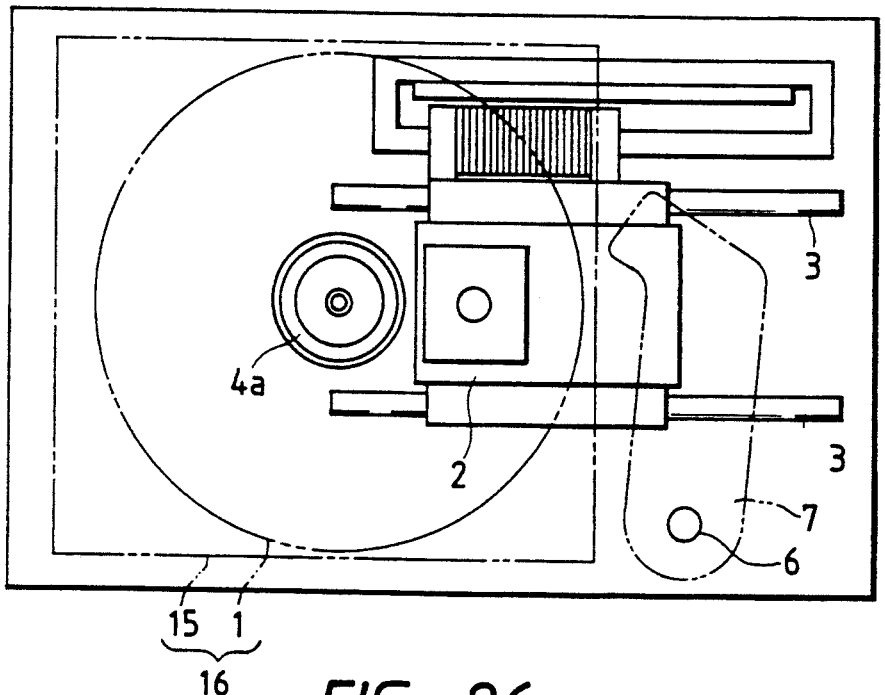
Figure 26:
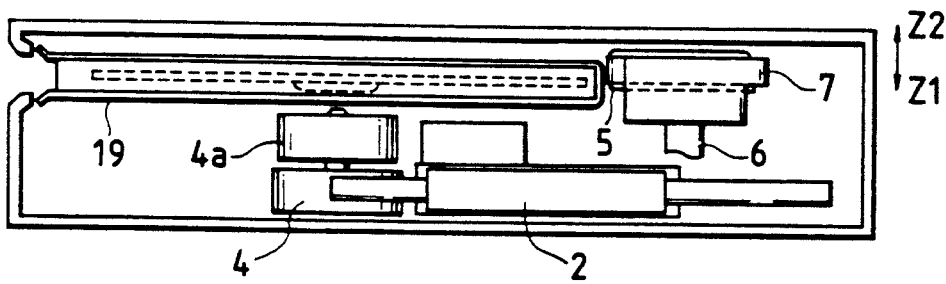
Figure 27:
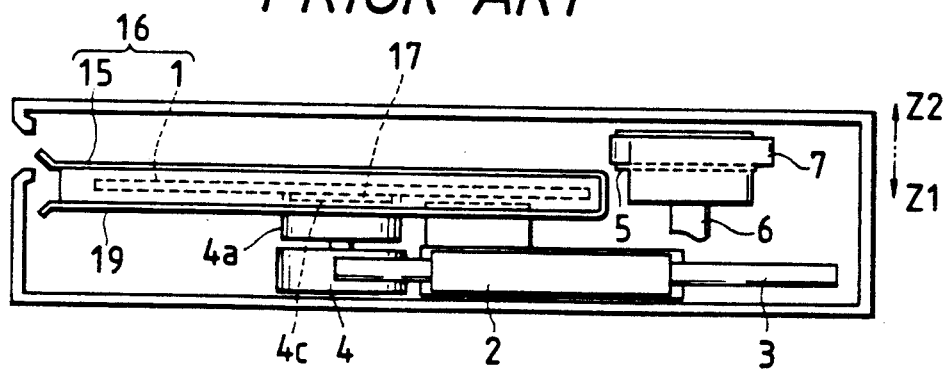

Secondly, a description will be made in terms of the operation of the conventional recording/reproducing apparatus. FIG. 23 is a top view illustrating a state that the cartridge 16 is being inserted from the external into the apparatus and FIG. 24 is a side view illustrating the inserting state of the cartridge 16 into the apparatus. At this state, the arm 7 is positioned and held so as not to be overlapped with the cartridge 16. On the other hand, FIG. 25 is a top view showing the state that the cartridge 16 is completely inserted into the apparatus and FIG. 26 is a side view showing the completely inserted state of the cartridge 16 into the apparatus. In FIGS. 23 to 27, numeral 19 is a cartridge holder for holding the cartridge 16, the cartridge holder 19 being disposed such that at the time of the insertion the cartridge 16 interferes with the rotating stable 4a. When the cartridge 16 is being inserted into the apparatus, the shutter 18 is opened by a shutter opening means (not shown) so that the first and second openings 15a and 15b appear to cause the photo-magnetic disc 1 to be exposed as illustrated in FIGS. 4 and 6. When the cartridge is completely inserted into the apparatus, as illustrated in FIG. 27, the cartridge holder 19 holds the cartridge 16 and moves in a direction indicated by an arrow Z1, and the rotating table 4a advances through the first opening 15a into the case 15 whereby the photo-magnetic disc 1 is mounted on the rotating table 4a by the magnetic suction force between the disc-like member 17 of the photo-magnetic disc 1 and the permanent magnet of the rotating table 4a. In addition, the optical pickup device 2 also advances through the first opening 15a into the case 15 to approach the photo-magnetic disc 1.

Figure 28:
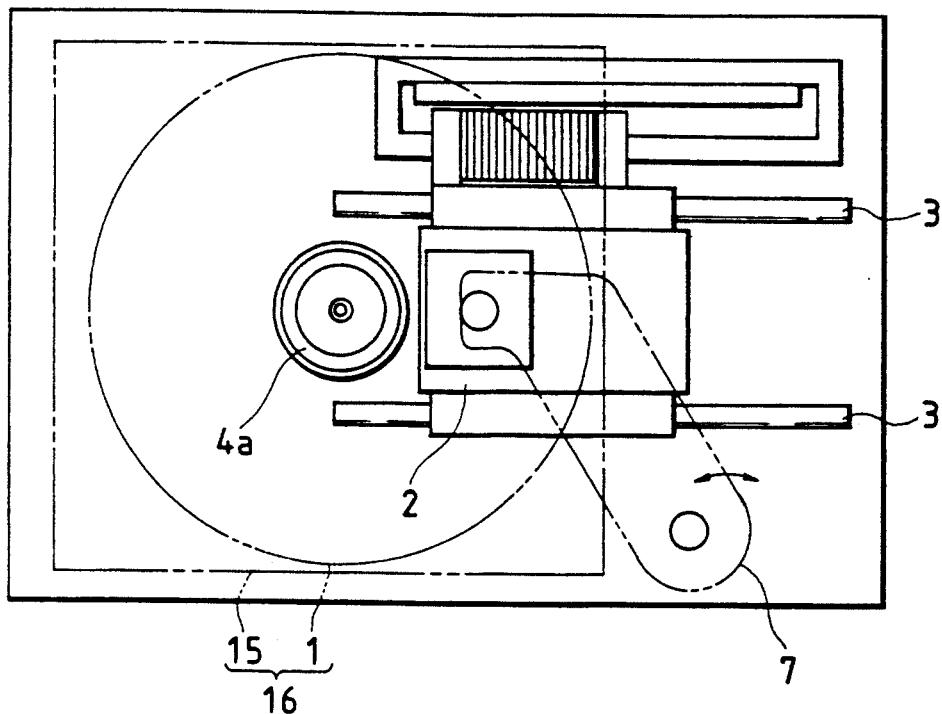
Figure 29:
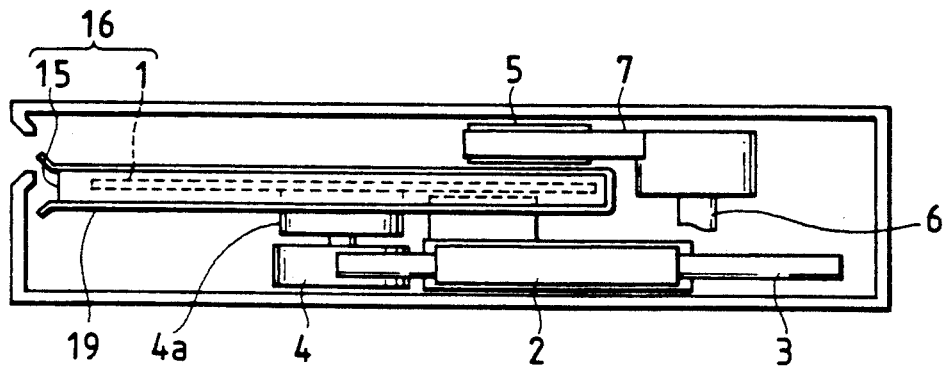

Secondly, as shown in FIGS. 28 and 29, the arm 7 rotates counterclockwise by means of the motor 11 (see FIG. 21) so that the electro-magnet 5 is positioned above the photo-magnetic disc 1. Thereafter, the photo-magnetic disc 1 is rotated by the motor 4 and the optical pickup device 2 is operated in the state that the electro-magnet 5 is not energized, whereby information is read out from the photo-magnetic disc 1. Further, the optical pickup device 2 is operated in the state that the electro-magnet 5 is energized to cause a magnetic field to be applied onto the surface of the photo-magnetic disc 1, whereby information is erased or written from or on the photo-magnetic disc 1.

In the case of discharging the cartridge 16, the rotation of the motor 4 stops in response to a discharge command so that the rotation of the photo-magnetic disc 1 also stops, and the arm 7 is rotated clockwise by the motor 11 so as to move up to the position that the arm 7 does not overlap with the cartridge 16. Thereafter, as shown in FIG. 26, the cartridge holder 19 holds the cartridge 16 and moves in a direction indicated by an arrow Z2 and the photo-magnetic disc 1 separates from the rotating table 4a, and the cartridge 16 is discharged from the apparatus by a discharging means such as a spring as illustrated in FIGS. 23 and 24.

However, as described above, such a conventional recording/reproducing apparatus requires the motor 11 for the movement of the electro-magnet 5 and a space and a control circuit therefor, whereby difficulty is encountered to achieve the size-reduction of the apparatus.

Figure 1:
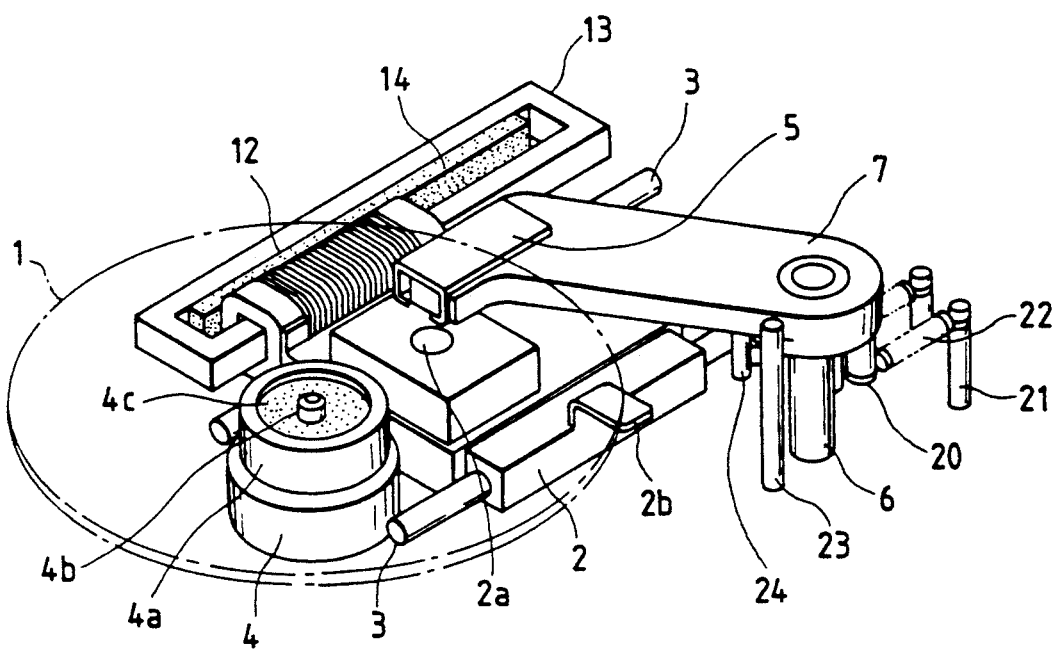
FIG. 1 is a perspective view showing an arrangement of a recording/reproducing apparatus according to an embodiment of the present invention.
Figure 2:
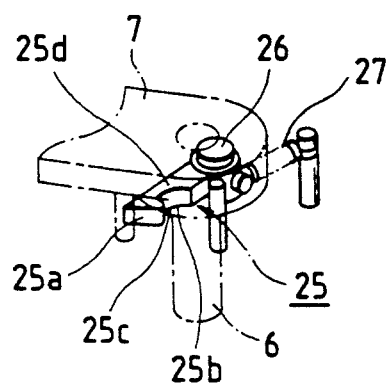
FIG. 2 is a perspective view showing an arrangement for driving a magnetic-field generating device of the FIG. 1 recording/reproducing apparatus.

Referring now to FIGS. 1 and 2, there is illustrated an arrangement of a recording/reproducing apparatus according to an embodiment of the present invention, where parts corresponding to those in FIGS. 21 and 22 are marked with the same numerals and the detailed description thereof will be omitted for brevity. In FIG. 1, an optical pick up device 2 is movable along a guide shaft 3 in the radius directions of a photo-magnetic disc 1 by means of a linearly driving motor comprising a coil 12 attached to the optical pickup device 2, a yoke 13 attached to the chassis and a permanent magnet 14 attached to the yoke 13. The optical pickup device 2 has an optical means to emit a light beam toward the photo-magnetic disc 1 and receive the light reflected from the photo-magnetic disc 1. The photo-magnetic disc 1, encased in a case as illustrated in FIGS. 3 to 6, is arranged to be rotatable through a rotating table 4a in accordance with the rotating force of a motor 4. An electro-magnet 5, acting as a magnetic field generating means to generate a magnetic field at a predetermined portion of the photo-electric disc 1 at the time of the writing and erasing of information, is provided at the vicinity of the photo-magnetic disc 1 and in opposed relation to the optical pickup 2 with the photo-magnetic disc 1 being interposed therebetween. The electro-magnet 5 is attached to an arm 7 supported by a shaft 6 to be movable about the shaft 6 in directions parallel to the surface of the photo-magnetic disc 1. The arm 7 is biased counterclockwise by means of a spring 22 stretched between a pin 20 provided on the back surface of the arm 7 and a pin 21 provided on a chassis (not shown). In the state shown in FIG. 1, the arm 7 is pressed by the biasing force of the spring 22 to come into contact with a pin 23 provided on the chassis. Further, the optical pickup device 2 is equipped with a moving plate 2b which is arranged to be movable in accordance with the movement of the optical pickup device 2. The moving plate 2b can come into contact with a pin 24 provided on the arm 7 so as to press the pin 24 so that the arm 7 is rotated clockwise.

Figure 8:
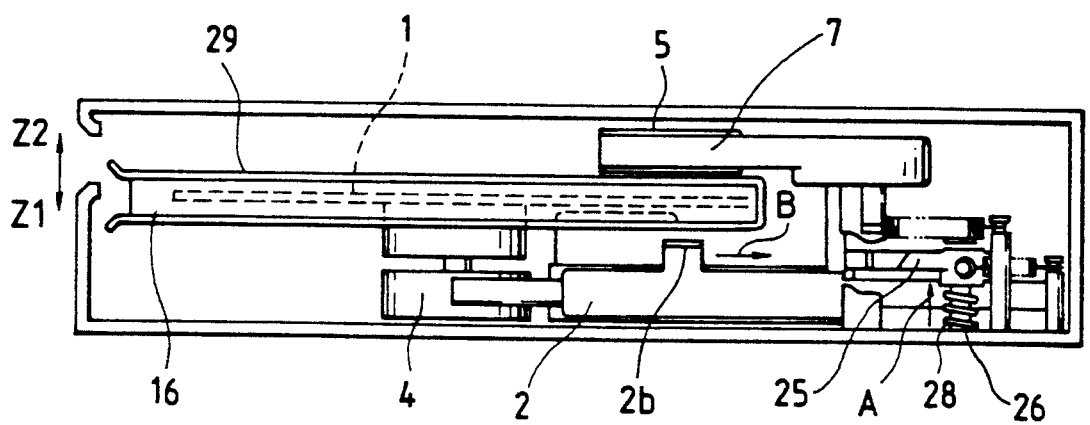

In FIG. 2, designated at numeral 25 is a rotatable lever one end portion of which is rotatably supported by a shaft 26 provided on the chassis. The lever 25 is biased counterclockwise by a spring 27 one end of which is connected to a pin provided on the chassis and the other end of which is connected to the lever 25. The lever 25 has a first inclined portion 25a, a second inclined portion 25b, a concave portion 25c and an upper surface 25d. The concave portion 25c is formed at a portion of a side surface of the lever 25, the first inclined portion 25a comprises a surface formed at the other end portion of the lever 25 by gradually tapering the width of the other end portion thereof so as to obliquely extend from the vicinity of the concave portion 25c toward the tip portion of the lever 25, and the second inclined portion 25b comprises a surface obliquely and upwardly extending from the lower surface of the concave portion 25c (the lower surface of the lever 25) toward the upper surface 25d thereof. Further, as shown in FIG. 8, the lever 25 is biased upwardly by a spring 28 in a direction indicated by an arrow A. Numeral 29 is a cartridge holder 29 arranged to hold the cartridge 16 and supported to be movable in directions indicated by arrows Z1 and Z2.

Further, a description will be made hereinbelow in terms of the operation of the recording/reproducing apparatus of this embodiment. FIGS. 9 to 12 show the states that the cartridge 16 is inserted into the apparatus 30 and the photo-magnetic disc 1 is coupled to the rotating table 4a. Here, the pip 24 of the arm 7 is engaged with the concave portion 25c of the level 25 and the arm 7 is held at a position whereby the arm 7 does not interfere with the insertion of the cartridge 16 into the apparatus 30.

Figure 9:
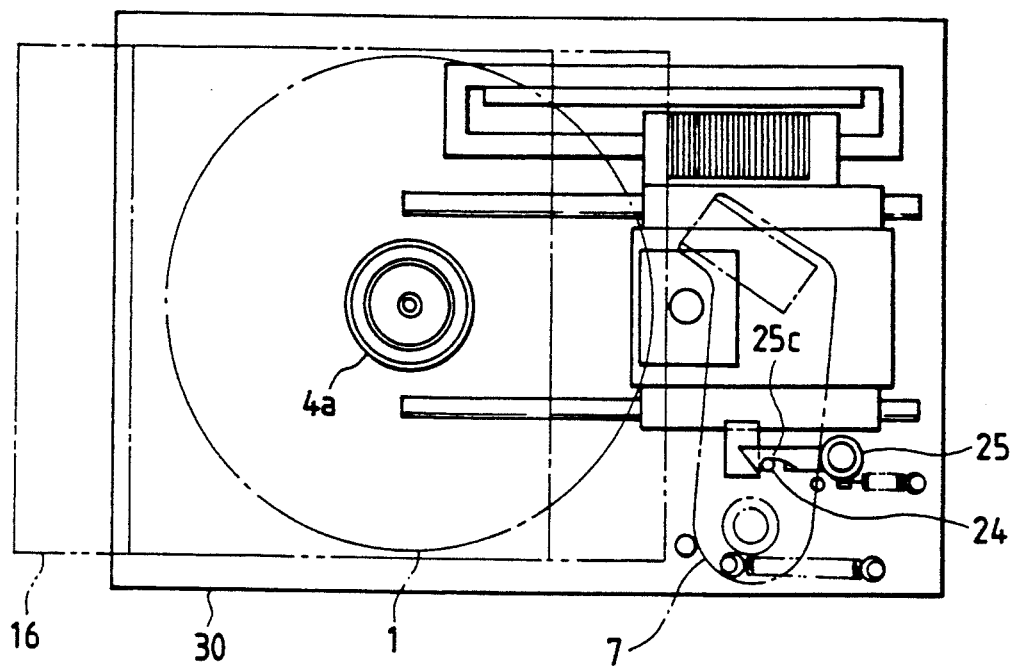
Figure 10:
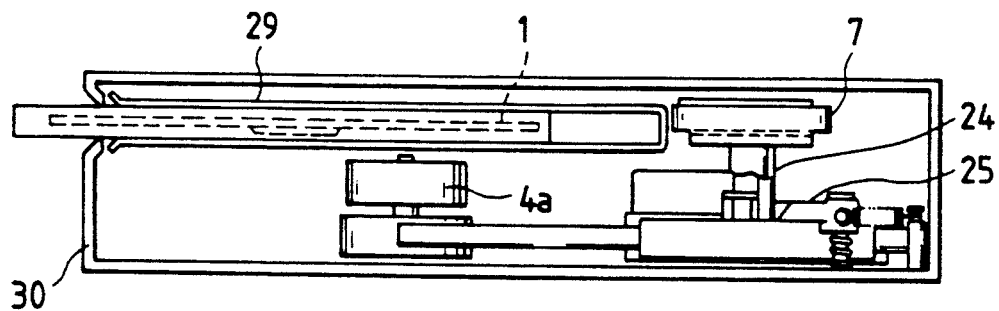
Figure 11:
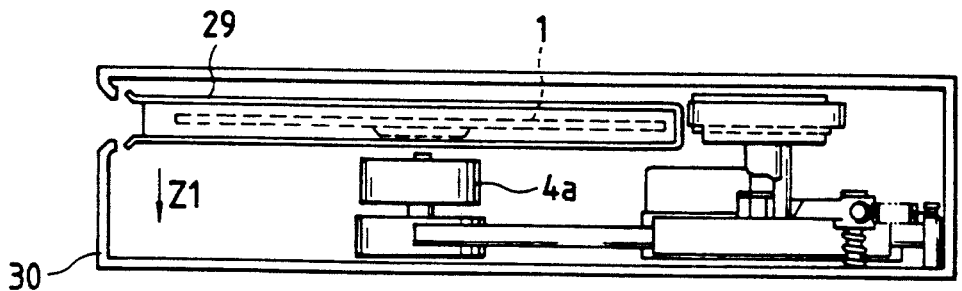
Figure 13:
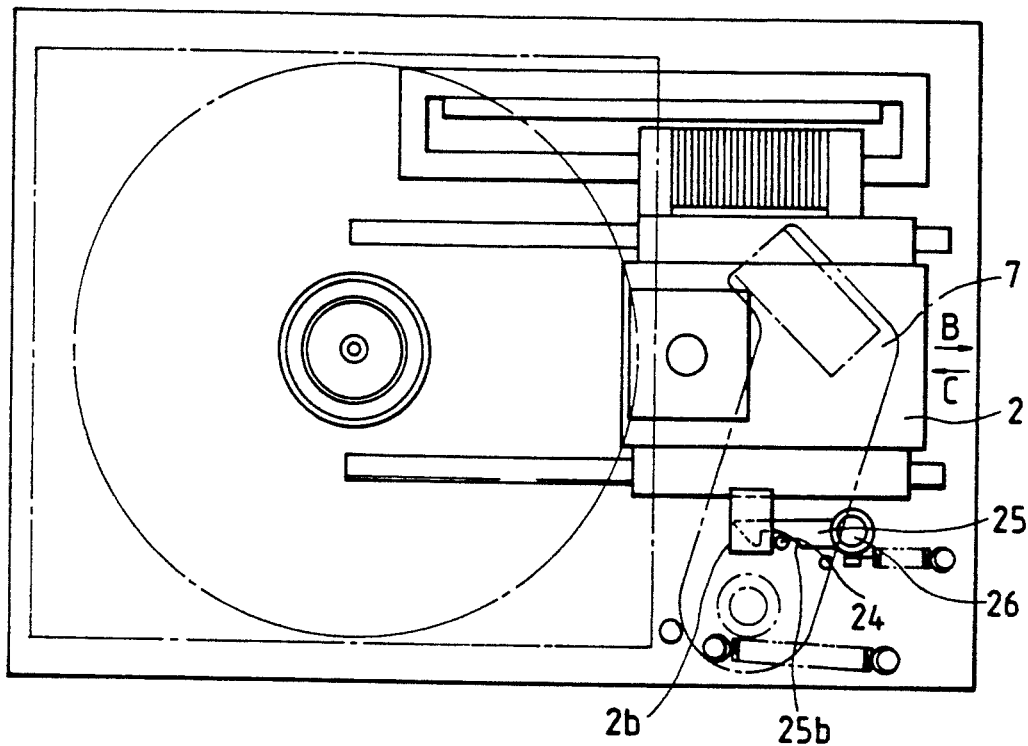
Figure 14:
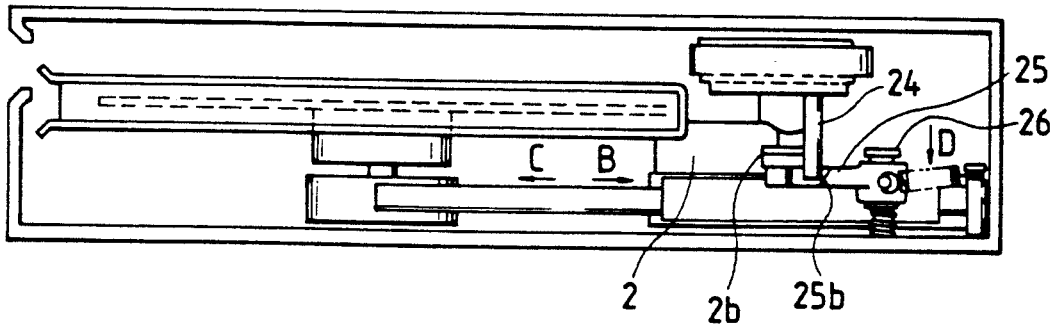
Figure 15:
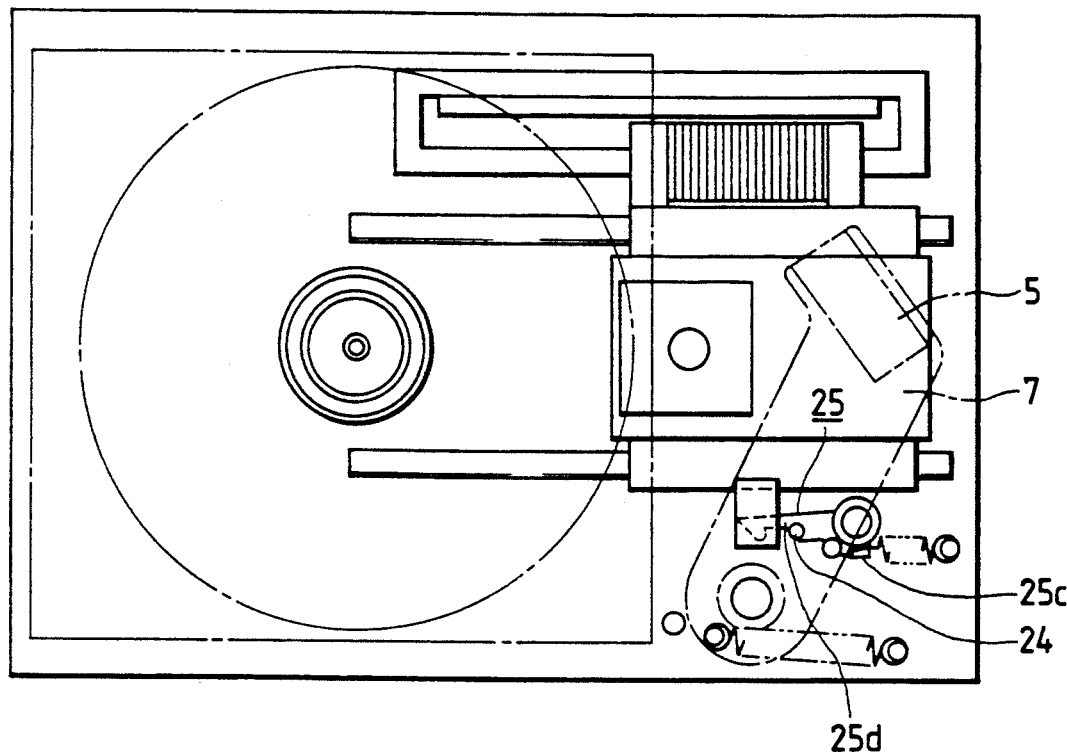
Figure 16:
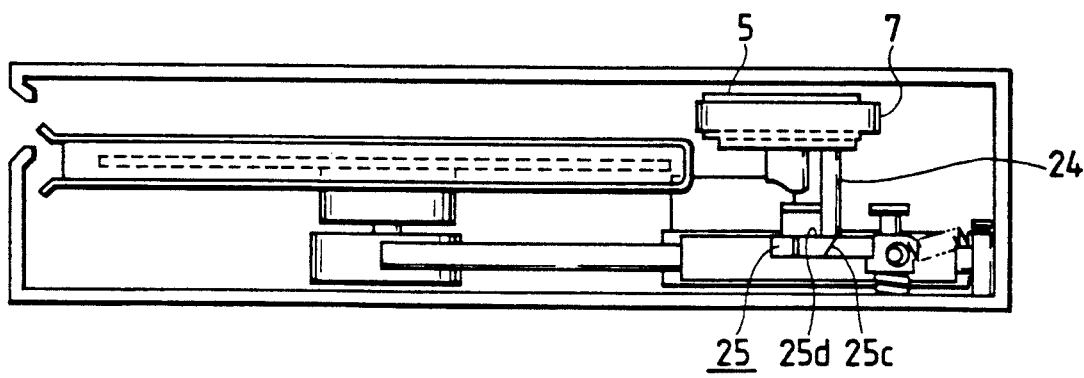

As shown in FIGS. 9 and 10, the cartridge 16 is inserted into the cartridge holder 29 of the apparatus 30 and at this time the shutter 18 of the cartridge 16 takes the opening state as illustrated in FIGS. 4 and 6. Thereafter, the cartridge holder 29 holding the cartridge 16 moves in the arrow Z1 direction as illustrated in FIG. 11 and the photo-magnetic disc 1 within the cartridge 16 is mounted on the rotating table 4a by means of the magnetic suction force between the permanent magnet 4c of the rotating table 4a and the disc-like member 17 of the photo-magnetic disc 1. After the mounting of the photo-magnetic disc 1 on the rotating table 4a, as illustrated in FIGS. 13 and 14, the optical pickup device 2 is moved in a direction indicated by an arrow B whereby the moving plate 2b comes into contact with the pin 24 of the arm 7 so as to cause the pin 24 to move along (go up) the second inclined portion 25b of the lever 25 to press and move the lever 25 in a direction indicated by an arrow D with respect to the shaft 26, the pin 24 finally reaching (running on) the upper surface 25d of the lever 25 as illustrated in FIGS. 15 and 16. At this time, the lever 25 rotates counterclockwise due to the biasing force of the spring 27.

Figure 7:
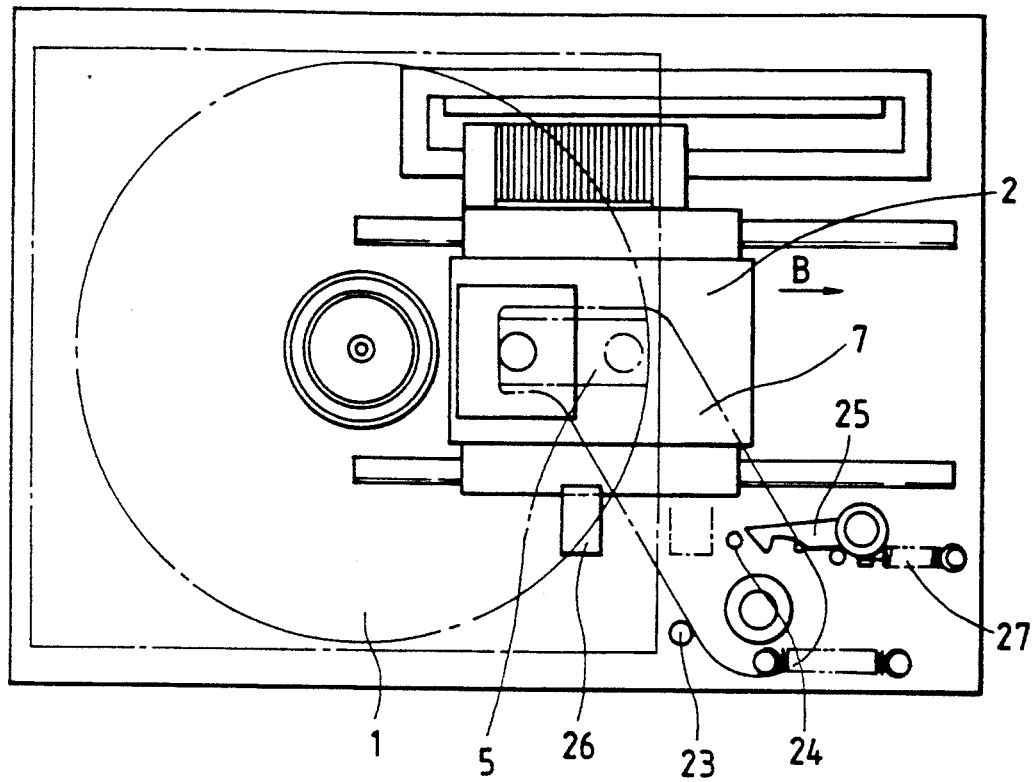
FIGS. 7 to 20 are top views and cross-sectional side views for describing the operation of the FIG. 1 recording/reproducing apparatus.
Figure 17:
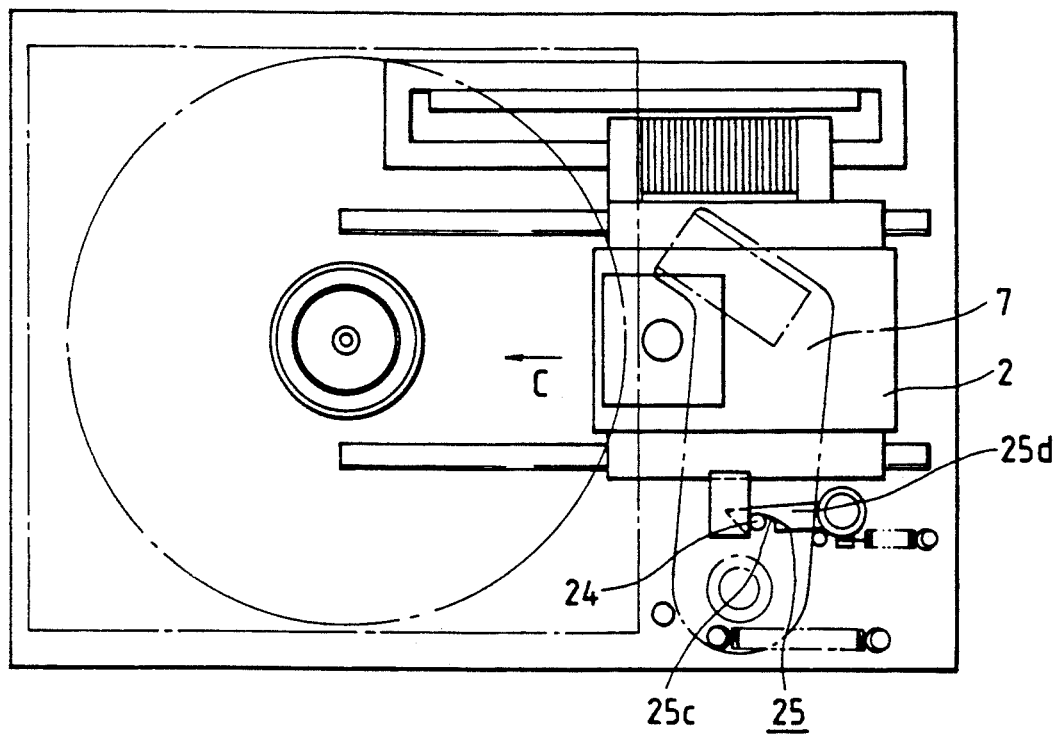
Figure 18:
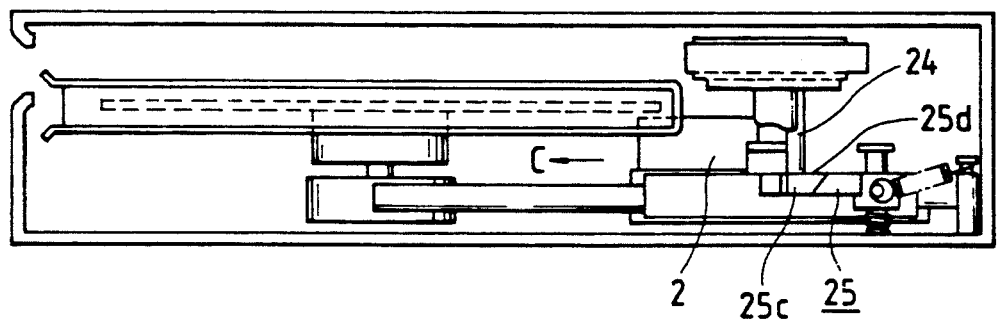

Thereafter, as illustrated in FIGS. 17 and 18, the optical pickup device 2 is moved in a direction indicated by an arrow C, and in response to the movement of the optical pickup device 2 the pin 24 slides on the upper surface 25d of the lever 25 so as not to engage with the concave portion 25c of the lever 25 so that the arm 7 continues to rotate counterclockwise in accordance with the movement of the optical pickup device 2 until coming into contact with the pin 23 whereby the electro-magnet 5 is positioned above the photo-magnetic disc 1 as shown in FIGS. 7 and 8. Then, for writing or erasing information on or from the photo-magnetic disc 2, the motor 4 is driven so as to rotate the photo-magnetic disc 1 and the optical pickup device 2 is operated in the state that the electro-magnet 5 is energized so that a magnetic field is applied onto the surface of the photo-magnetic disc 1. For reading the information therefrom, the optical pickup device 2 is operated in the state that the electro-magnet 5 is not operated. In the moving range of the optical pickup device 2 taken for the reading, writing and erasing of the information, the moving plate 2b is arranged so as not to come into contact with the pin 24 of the arm 7. That is, the position indicated by a dotted line in FIG. 7 is the position of the moving plate 2b taken when the optical pickup device 2 moves up to the position corresponding to the outermost recording area of the photo-magnetic disc 1.

Figure 12:
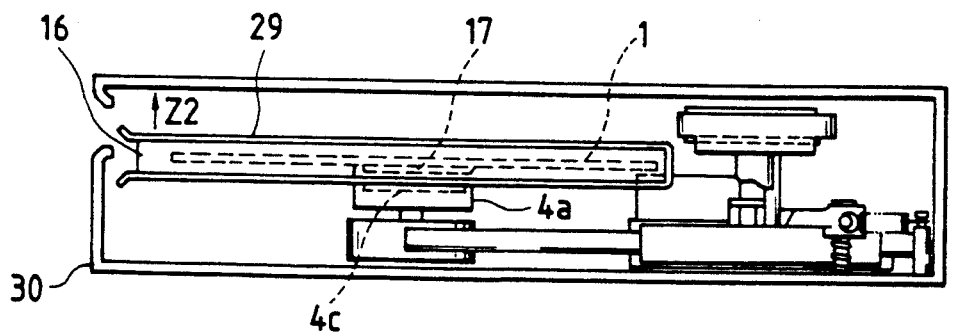
Figure 19:
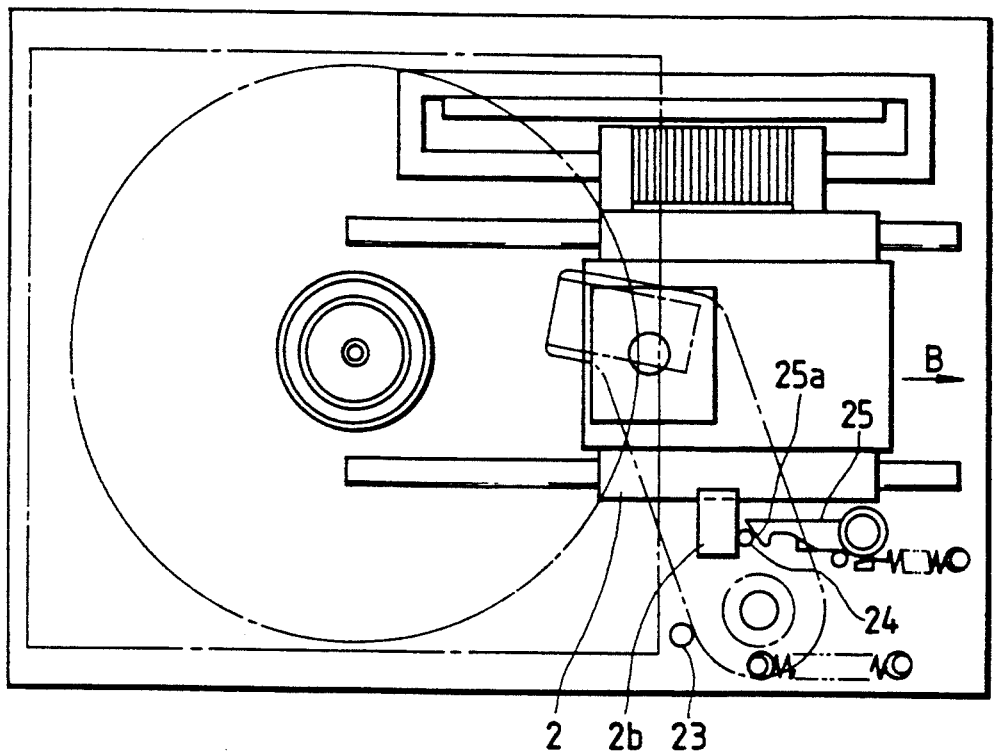
Figure 20:
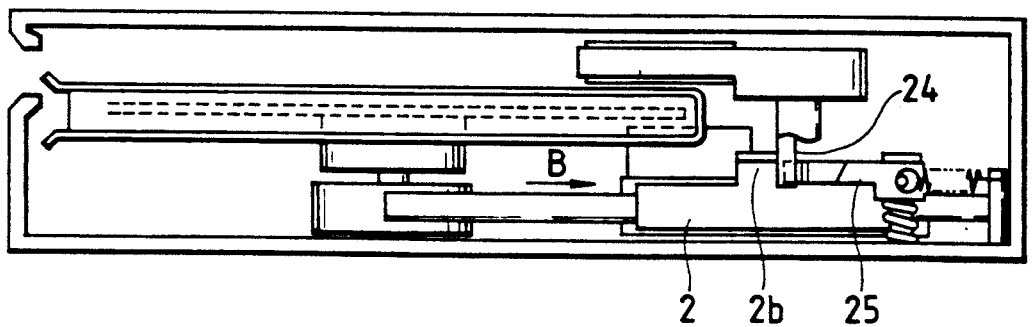

On the other hand, in the case of discharging the cartridge 16, the rotation of the motor 4 stops in response to a discharging command so that the rotation of the photo-magnetic disc 1 also stops, and the optical pickup device 2 moves in the arrow B direction in FIGS. 7 and 8. Thus, the moving plate 2b presses the pin 24 of the arm 7 so that the arm 7 is rotated clockwise and the pin 24 slides on the first inclined portion 25a of the lever 25 as illustrated in FIGS. 19 and 20. When the optical pickup device 2 further moves in the arrow B direction, the pin 24 is engaged with the concave portion 25c of the lever 25 as illustrated in FIG. 9 whereby the arm 7 is held at a position that is not above the cartridge 16. Thereafter, the cartridge holder 29 holding the cartridge 16 therein is moved in the arrow Z2 direction as illustrated in FIG. 12 and the photo-magnetic disc 1 is separated from the rotating table 4a as illustrated in FIG. 11 and the cartridge 16 is discharged from the apparatus 30 by a discharging means such as a spring as illustrated in FIG. 10.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A recording/reproducing apparatus comprising:
   optical pickup means for applying a light beam to a recording medium to receive light reflected from said recording medium;
   drive means for linearly and reciprocally moving said optical pickup means relative to said recording medium;
   magnetic-field generating means for generating a magnetic field on said recording medium;
   arm means for holding said magnetic-field generating means, said arm means being pivotally arranged so as to displace said magnetic-field generating means relative to said recording medium; and
   actuating means for converting said linear movement of said optical pickup means caused by said drive means to a rotational motion of said arm means so as to pivotally move said arm means in response to said linear movement of said optical pickup means caused by said drive means, so as to displace said magnetic-field generating means relative to said recording medium.

2. The apparatus as set forth in claim 1, wherein said actuating means pivotally moves said arm means in a first direction so as to displace said magnetic-field generating means toward a center of the recording medium when said drive means moves said optical pickup means toward the center of the recording medium, and in a second direction opposite to said first direction so as to displace said magnetic-field generating means away from the center of the recording medium when said drive means moves said optical pickup means away from the center of the recording medium.

3. A recording/reproducing apparatus comprising:
   optical pickup means for applying a light beam to a recording medium to receive light reflected from said recording medium;
   drive means for moving said optical pickup means relative to said recording medium;
   magnetic-field generating means for generating a magnetic field on said recording medium;
   arm means for holding said magnetic-field generating means, said arm means being pivotally arranged so as to displace said magnetic-field generating means relative to said recording medium; and actuating means pivotally moving said arm means in a first direction so as to displace said magnetic-field generating means toward a center of the recording medium when said drive means moves said optical pickup means toward the center of the recording medium, and in a second direction opposite to said first direction so as to displace said magnetic-field generating means away from the center of the recording medium when said drive means moves said optical pickup means away from the center of the recording medium, said actuating means having a first engaging member fixed to said optical pickup means and a second engaging member fixed to said arm means, and said actuating means pivotally moves said arm means by engagement of said first and second engaging member.

4. The apparatus as set forth in claim 3, wherein said actuating means includes biasing means for constantly biasing said arm means to move in said first direction, said first engaging member pushes said second engaging member against a biasing force of said biasing means so as to pivotally move said arm means in said second direction when said drive means moves said optical pickup means away from the center of the recording medium, and said biasing means pivotally moves said arm means in said first direction such that said second engaging member follows said first engaging member due to said biasing force of the biasing means when said drive means moves said optical pickup means toward the center of the recording medium.

5. The apparatus as set forth in claim 4, wherein stopper means is provided for preventing the pivotal movement of said arm means in said first direction beyond a predetermined limit.

6. The apparatus as set forth in claim 5, wherein said optical pickup means performs a tracking action on said recording medium in a condition where the pivotal movement of said arm means is prevented by said stopper means, and said tracking action of the optical pickup means has no effect on the pivotal movement of said arm means.

7. The apparatus as set forth in claim 4, wherein said actuating means further includes lever means, said lever means having locking means which engages with said second engaging member to lock the pivotal movement of said arm means when said second engaging member is moved by movement of said first engaging member moving away from the center of the recording medium.

8. The apparatus as set forth in claim 7, wherein said locking means releases said second engaging member when said second engaging member is further pushed by said first engaging member so as to be displaced beyond a predetermined limit.

9. The apparatus as set forth in claim 8, wherein in order to pivotally move said arm means in said first direction from a condition where said second engaging member is locked by said locking means, said drive means first moves said optical pickup means away from the center of the recording medium so as to displace said second engaging member beyond said predetermined limit to release said second engaging member from said locking means, and then moves said optical pickup means toward the center of the recording medium so that said biasing means pivotally moves said arm means in said first direction with said second engaging member following said first engaging member.

10. A recording/reproducing apparatus comprising:

optical pickup means for applying a light beam to a recording medium to receive light reflected from said recording medium;

magnetic-field generating means for generating a magnetic field on said recording medium;

drive means for moving said optical pickup means relative to said recording medium in a range within and outside a recording area of said recording medium; and power transmission means for transmitting a driving power of said drive means to said magnetic-field generating means so as to move said magnetic-field generating means relative to said recording medium when said drive means moves said optical pickup means outside the recording area of said recording medium, while said power transmission means is prevented from transmitting said driving power to said magnetic-field generating means when said drive means moves said optical pickup means within the recording area of said recording medium.

11. The apparatus as set forth in claim 10, wherein said magnetic-field generating means is held by a movably arranged support member, and wherein said power transmission means transmits said driving power to said support member to move said magnetic-field generating means relative to said recording medium.

12. The apparatus as set forth in claim 11, wherein said power transmission means transmits said driving power to said support member via said optical pickup means, and said power transmission means includes a first engaging member fixed to said optical pickup means and a second engaging member fixed to said support member, said first and second engaging members being arranged so as to be prevented from engaging each other while said drive means moves said optical pickup means within said recording area of the recording medium, so that the transmission of said driving power to said support member is prevented.

13. The apparatus as set forth in claim 12, wherein biasing means is provided for constantly biasing said support member to move in a first direction so as to displace said magnetic-field generating means toward a center of said recording medium, and said first engaging member pushes said second engaging member against a biasing force of said biasing means so as to move said support member in a second direction opposite to said first direction to displace said magnetic-field generating means away from the center of the recording medium when said drive means moves said optical pickup means away from the center of the recording medium outside said recording area of the recording medium, while said biasing means moves said support member in said first direction such that said second engaging member follows said first engaging member due to said biasing force of the biasing means when said drive means moves said optical pickup means toward the center of the recording medium outside said recording area of the recording medium.

14. The apparatus as set forth in claim 13, wherein stopper means is provided for preventing the movement of said support member in said first direction beyond a predetermined limit.

15. The apparatus as set forth in claim 14, wherein said optical pickup means performs a tracking action on said recording area of the recording medium in a condition where the movement of said support member is prevented by said stopper means, and said first and second engaging members are out of engagement with each other during the tracking action of said optical pickup means.

16. The apparatus as set forth in claim 13 wherein lever means is provided, said lever means having locking means which engages with said second engaging member to lock the movement of said support member when said second engaging member is moved by movement of said first engaging member moving away from the center of the recording medium.

17. The apparatus as set forth in claim 16, wherein said locking means releases said second engaging member when said second engaging member is further pushed by said first engaging member so as to be displaced beyond a predetermined limit.

18. The apparatus as set forth in claim 17, wherein in order to move said support member in said first direction from a condition where said second engaging member is locked by said locking means, said drive means first moves said optical pickup means away from the center of the recording medium so as to displace said second engaging member beyond said predetermined limit to release said second engaging member from said locking means, and then moves said optical pickup means toward the center of the recording medium so that said biasing means moves said support member in said first direction with said second engaging member following said first engaging member.

19. A recording/reproducing apparatus comprising:
optical pickup means for applying a light beam to a recording medium to receive light reflected from said recording medium:
drive means for moving said optical pickup means relative to said recording medium;
magnetic-field generating means for generating a magnetic field on said recording medium;
biasing means for biasing said magnetic-field generating means in a direction toward a position where said magnetic-field generating means faces a recording area of said recording medium; and
power transmission means, provided on said optical pickup means, for moving said magnetic-field generating means against a biasing force of said biasing means by engagement with said magnetic-field generating means.

* * * * *